(12) United States Patent
Kidera

(10) Patent No.: US 10,693,383 B2
(45) Date of Patent: Jun. 23, 2020

(54) POWER CONVERSION DEVICE

(71) Applicant: Panasonic Intellectual Property Management Co., Ltd., Osaka (JP)

(72) Inventor: Kazunori Kidera, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/490,536

(22) PCT Filed: Dec. 7, 2017

(86) PCT No.: PCT/JP2017/044046
§ 371 (c)(1),
(2) Date: Aug. 31, 2019

(87) PCT Pub. No.: WO2018/179605
PCT Pub. Date: Oct. 4, 2018

(65) Prior Publication Data
US 2020/0014307 A1   Jan. 9, 2020

(30) Foreign Application Priority Data

Mar. 29, 2017  (JP) ................................. 2017-065940

(51) Int. Cl.
*H02M 3/335*  (2006.01)
*H02M 3/337*  (2006.01)
*H02M 1/00*  (2006.01)

(52) U.S. Cl.
CPC ..... *H02M 3/33584* (2013.01); *H02M 3/3376* (2013.01); *H02M 3/33569* (2013.01);
(Continued)

(58) Field of Classification Search
CPC ......... H02M 3/33584; H02M 3/33576; H02M 3/33569; H02M 2001/0032; H02M 1/00; H02M 3/00; H02M 3/22
See application file for complete search history.

(56) References Cited

U.S. PATENT DOCUMENTS 7,796,406 B2 *  9/2010  Lev ................... H02M 3/33592
                                                         363/132
9,537,408 B2 *  1/2017  Hirano .............. H02M 3/33546
(Continued)

FOREIGN PATENT DOCUMENTS

JP         2016-152687 A     8/2016

OTHER PUBLICATIONS

International Search Report for corresponding Application No. PCT/JP2017/044046, dated Jan. 30, 2018.

*Primary Examiner* — Emily P Pham
(74) *Attorney, Agent, or Firm* — Renner Otto Boisselle & Sklar LLP

(57) ABSTRACT

A control circuit converts power by controlling a phase difference between a switching phase of a plurality of switching elements of a first bridge circuit and a switching phase of a plurality of switching elements of a second bridge circuit such that the control circuit controls the phase difference to be smaller to reduce the output power. When the phase difference reaches a predefined lower limit value in a step-down mode of stepping down the input power, the control circuit controls an on-time of the plurality of switching elements of the second bridge circuit to be shorter while the phase difference is fixed at the lower limit value.

6 Claims, 3 Drawing Sheets

(52) U.S. Cl.
CPC .............. *H02M 3/33576* (2013.01); *H02M 2001/0003* (2013.01); *H02M 2001/0032* (2013.01)

(56) References Cited

U.S. PATENT DOCUMENTS

| | | | |
|---|---|---|---|
| 9,627,979 B2* | 4/2017 | Safaee | H02M 3/33507 |
| 9,748,855 B2* | 8/2017 | Lee | H02M 3/33584 |
| 10,044,282 B2* | 8/2018 | Jimichi | H02M 3/33584 |
| 10,256,738 B2* | 4/2019 | Bleus | H02M 3/33584 |
| | | | 307/24 |
| 2015/0021998 A1* | 1/2015 | Trescases | H02J 3/385 |
| | | | 307/46 |
| 2015/0365005 A1* | 12/2015 | Panov | H02M 3/33584 |
| | | | 307/24 |
| 2016/0139651 A1* | 5/2016 | Schramm | G06F 1/3293 |
| | | | 713/323 |
| 2017/0187297 A1* | 6/2017 | Narita | H02M 3/33584 |
| 2017/0358996 A1* | 12/2017 | Higaki | H02J 7/342 |
| 2018/0048240 A1* | 2/2018 | Hayasaki | H02M 3/33584 |

* cited by examiner (COMPARATIVE EXAMPLE)

POWER CONVERSION DEVICE

TECHNICAL FIELD

The present invention relates to power conversion devices that convert a DC power into a desired DC power.

BACKGROUND ART

With the widespread use of power storage systems and electric vehicles in recent years, there is an increasing demand for insulated bidirectional DC-DC converters. One example of insulated bidirectional DC-DC converters is a dual active bridge (DAB) converter (see, for example, patent reference 1). A DAB converter includes a bridge circuit provided on the primary side and on the second side of an insulated transformer. The direction and amount of power can be adjusted by adjusting the phase difference between the switching control of the bridge circuit on the primary side and the switching control of the bridge circuit on the secondary side. More specifically, a small phase difference decreases the output power, and a large phase difference increases the output power.

PATENT LITERATURE

[Patent Literature 1] JP2016-152687

SUMMARY OF INVENTION

Technical Problem

In DAB converters like this, the output voltage is lower than the input voltage in the step-down mode. Therefore, the output current increases with an elapse of time while the power is being supplied from the input side to the output side, even if the phase difference is controlled to be sufficiently small. It is therefore difficult to adjust the output current to be sufficiently small in the step-down mode, and there is a room for improvement in the range of adjustment of the output current.

The disclosure addresses the above-described issue, and a general purpose thereof is to provide a power conversion device in which a bridge circuit is provided on the primary side and on the secondary side of an insulated transformer and the range of adjustment of the output current in the step-down mode is improved.

Solution to Problem

A power conversion device according to an embodiment of the present disclosure includes: a first bridge circuit that includes a plurality of switching elements and supplies an output power to a load; a second bridge circuit that includes a plurality of switching elements and receives an input power from a DC power supply; an insulated transformer connected between the first bridge circuit and the second bridge circuit; and a control circuit that controls the plurality of switching elements of the first bridge circuit and the plurality of switching elements of the second bridge circuit. The control circuit converts power by controlling a phase difference between a switching phase of the plurality of switching elements of the first bridge circuit and a switching phase of the plurality of switching elements of the second bridge circuit such that the control circuit controls the phase difference to be smaller to reduce the output power, and, when the phase difference reaches a predefined lower limit value in a step-down mode of stepping down the input power, the control circuit controls an on-time of the plurality of switching elements of the second bridge circuit to be shorter while the phase difference is fixed at the lower limit value.

Advantageous Effects of Invention

According to the present disclosure, the range of adjustment of the output current in the step-down mode is improved.

DESCRIPTION OF EMBODIMENTS

Figure 1:
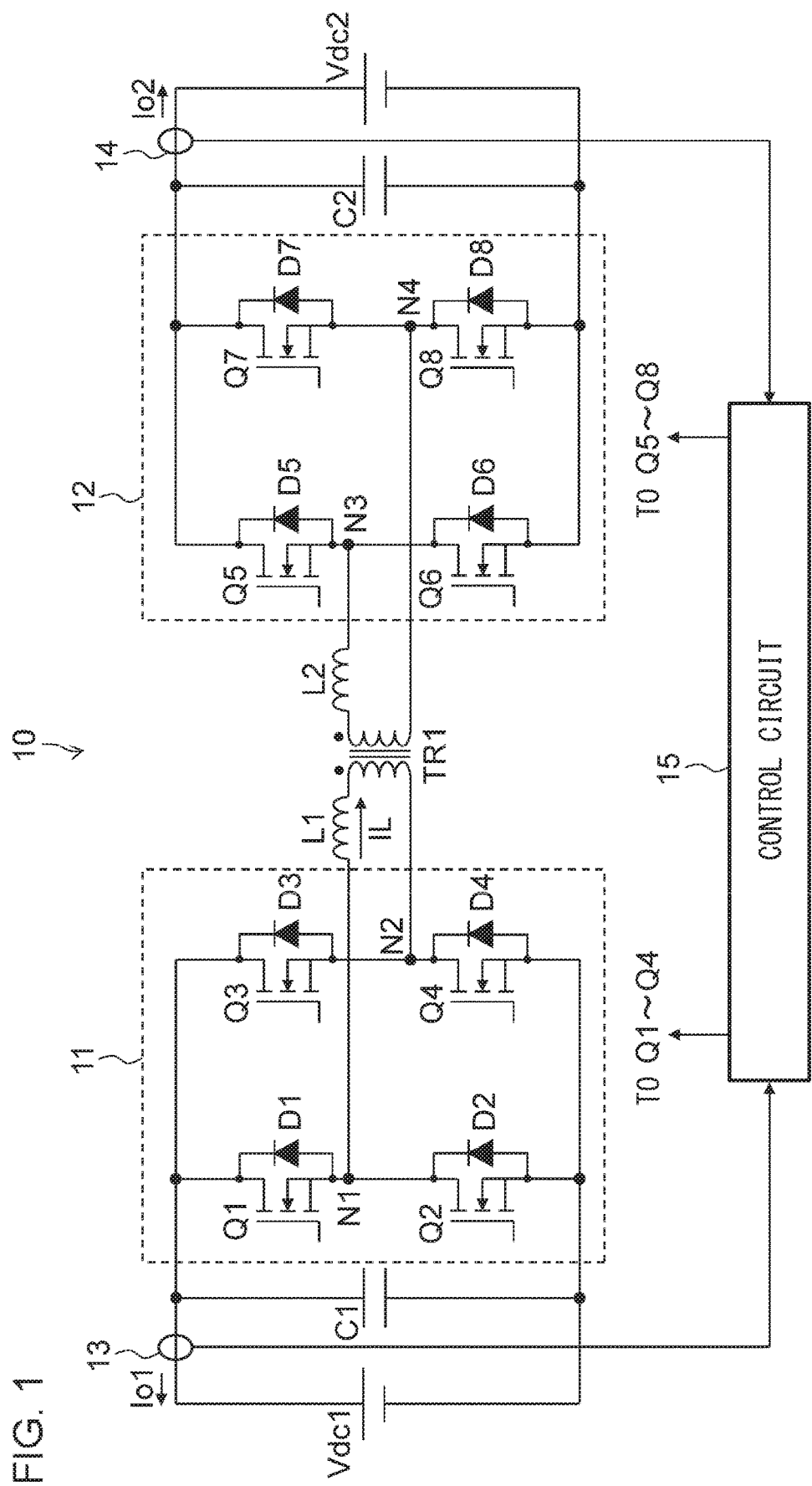
FIG. 1 shows a configuration of a power conversion device according to an embodiment.

FIG. 1 shows a configuration of a power conversion device 10 according to an embodiment. The power conversion device 10 is an insulated bidirectional DC-DC converter (DAB converter) capable of converting a DC power supplied from a DC power supply Vdc1 and outputting a power as converted to a DC power supply Vdc2 and converting a DC power supplied from the DC power supply Vdc2 and outputting a power as converted to the DC power supply Vdc1. The power conversion device 10 can step up or step down a voltage.

The DC power supply Vdc1 is embodied by, for example, a storage battery, an electric double layer capacitor, a solar cell, a fuel cell, or the like. For example, a DC-AC inverter for converting the DC power supplied from the power conversion device 10 into an AC power and outputting the AC power to a commercial power system may be connected as the DC power supply Vdc2. In the case the DC power supply Vdc1 is a storage battery and the DC power supply Vdc2 is a DC-AC inverter, the DC-AC inverter converts the AC power supplied from the commercial power system into a DC power, and the power conversion device 10 can subject the DC power to power conversion to charge the storage battery.

The power conversion device 10 includes a first capacitor C1, a first bridge circuit 11, an insulated transformer TR1, a first leak inductance L1, a second leak inductance L2, a second bridge circuit 12, a second capacitor C2, current detectors 13, 14, and a control circuit 15.

The first capacitor C1 is connected parallel to the DC power supply Vdc1. For example, an electrolytic capacitor is used for the first capacitor C1. The first bridge circuit 11 is a full-bridge circuit in which a first arm and a second arm are connected in parallel. A first switching element Q1 and a second switching element Q2 are connected in series in the first arm, and a third switching element Q3 and a fourth switching element Q4 are connected in series in the second arm. The first bridge circuit 11 is connected in parallel to the DC power supply Vdc1 and the first capacitor C1, and a midpoint N1 of the first arm and a midpoint N2 of the second arm are connected to the respective ends of the primary winding of the insulated transformer TR1.

The second bridge circuit 12 is a full-bridge circuit in which a third arm and a fourth arm are connected in parallel. A fifth switching element Q5 and a sixth switching element Q6 are connected in series in the third arm, and a seventh switching element Q7 and an eighth switching element Q8 are connected in series in the fourth arm. A midpoint N3 of the third arm and a midpoint N4 of the fourth arm are connected to the respective ends of the secondary winding of the insulated transformer TR1. The second bridge circuit 12 is connected in parallel to the second capacitor C2 and the DC power supply Vdc2.

A metal-oxide-semiconductor field-effect transistor (MOSFET) can be used as the first switching element Q1-the eighth switching element Q8. The drain terminal of the first switching element Q1 and the drain terminal of the third switching element Q3 are connected to the positive electrode of the DC power supply Vdc1. The source terminal of the second switching element Q2 and the source terminal of the fourth switching element Q4 are connected to the negative electrode of the DC power supply Vdc1. The source terminal of the first switching element Q1 and the drain terminal of the second switching element Q2 are connected, and the source terminal of the third switching element Q3 and the drain terminal of the fourth switching element Q4 are connected.

Similarly, the drain terminal of the fifth switching element Q5 and the drain terminal of the seventh switching element Q7 are connected to the positive electrode of the DC power supply Vdc2. The source terminal of the sixth switching element Q6 and the source terminal of the eighth switching element Q8 are connected to the negative electrode of the DC power supply Vdc2. The source terminal of the fifth switching element Q5 and the drain terminal of the sixth switching element Q6 are connected, and the source terminal of the seventh switching element Q7 and the drain terminal of the eighth switching element Q8 are connected.

Parasitic diodes formed in the source to drain direction of the first switching element Q1-the eighth switching element Q8 can be used as first diode D1-eighth diode D8. An insulated gate bipolar transistor (IGBT) can be used in the first switching element Q1-the eighth switching element Q8. In this case, the first diode D1-the eighth diode D8 are connected in parallel to the first switching element Q1-the eighth switching element Q8 in the reverse direction.

The insulated transformer TR1 transforms the output voltage of the first bridge circuit 11 connected to the primary winding in accordance with the turn ratio between the primary winding and the secondary winding and outputs the voltage as transformed to the second bridge circuit 12 connected to the secondary winding. Further, the insulated transformer TR1 transforms the output voltage of the second bridge circuit 12 connected to the secondary winding in accordance with the turn ratio between the primary winding and the secondary winding and outputs the voltage as converted to the first bridge circuit 11 connected to the primary winding. The first leak inductance L1 is formed between the midpoint N1 of the first arm of the first bridge circuit 11 and one end of the primary winding of the insulated transformer TR1. The second leak inductance L2 is formed between the midpoint N3 of the first arm of the second bridge circuit 12 and one end of the secondary winding of the insulated transformer TR1.

The designer may connect an inductance element having an arbitrary inductance value between the first bridge circuit 11 and the primary winding of the insulated transformer TR1 and between the second bridge circuit 12 and the secondary winding of the insulated transformer TR1.

The second capacitor C2 is connected in parallel to the second bridge circuit 12. For example, an electrolytic capacitor is used for the second capacitor C2.

The current detector 13 detects an output current Io1 output from the power conversion device 10 to the DC power supply Vdc1 and outputs the detected current to the control circuit 15. The current detector 14 detects an output current Io2 output from the power conversion device 10 to the DC power supply Vdc2 and outputs the detected current to the control circuit 15. A circuitry may be added, in which a voltage detector (not shown) for detecting the voltage of the DC power supply Vdc1 (the voltage across the first capacitor C1) and the voltage of the DC power supply Vdc2 (the voltage across the second capacitor C2) is provided, and the voltage is output to the control circuit 15.

The configuration of the control circuit 15 can be realized by cooperation of hardware resources and software resources or only by hardware resources. An analog device, microcomputer, DSP, ROM, RAM, FPGA, and other LSIs can be used as hardware resources. Programs such as firmware can be used as software resources.

For power conversion in the direction from the DC power supply Vdc1 to the DC power supply Vdc2, the control circuit 15 controls the first switching element Q1-the eighth switching element Q8 so that the output current Io2 maintains the value designated by a current command. For power conversion in the direction from the DC power supply Vdc2 to the DC power supply Vdc1, the control circuit 15 controls the first switching element Q1-the eighth switching element Q8 so that the output current Io1 maintains the value designated by a current command.

The control circuit 15 performs different modes of control in the step-up mode and in the step-down mode. Whether the operation is in the step-up mode or a step-down mode is determined by the relative magnitude of the DC power supply Vdc1 and the DC power supply Vdc2 and the turn ratio of the primary winding and the secondary winding of the insulated transformer TR1. For example, it is assumed that the turn ratio of the primary winding and the secondary winding of the insulated transformer is 2:1, the voltage of the DC power supply Vdc1 is 300 V, and the voltage of the DC power supply Vdc2 is 200 V. When power is converted in the direction from the DC power supply Vdc1 to the DC power supply Vdc2 in this condition, the secondary side voltage (200 V) will be higher than the secondary-side converted voltage (150 V) of the primary side voltage so that the operation will be in the step-up mode. When power is converted in the direction from the DC power supply Vdc2 to the DC power supply Vdc1 in this condition, the primary side voltage (300 V) will be higher than the primary-side converted voltage (400 V) of the secondary side voltage so that the operation will be in the step-down mode. In other words, the operation is in the step-up mode when the output current decreases with an elapse of time while power is being supplied from the input side to the output side. Further, the operation is in the step-down mode when the output current increases with an elapse of time while power is being supplied from the input side to the output side.

In the step-up mode, the control circuit 15 performs control similar to the control of a known DAB converter. In other words, the control circuit 15 in the step-up mode converts power by controlling the phase difference between the switching phase of the first switching element Q1-the fourth switching element Q4 of the first bridge circuit 11 and the switching phase of the fifth switching element Q5-the eighth switching element Q8 of the second bridge circuit 12, thereby controlling the direction and amount of power output from the power conversion device 10. In this process, the control circuit 15 controls the first switching element Q1-the eighth switching element Q8, fixing the on-time (duty cycle) of the elements. The on-time will be referred to as a reference time.

In the step-down mode, the control circuit 15 first operates in the phase difference control mode. In the phase difference control mode, the control circuit 15 controls the switching phase of the first switching element Q1-the eighth switching element Q8 for power conversion, as in the case of the control in the step-up mode.

A description will now be given of an example of performing power conversion in the direction from the DC power supply Vdc2 to the DC power supply Vdc1 in the step-down mode. In other words, the second bridge circuit 12 receives a DC input power from the DC power supply Vdc2, and the first bridge circuit 11 supplies a DC output power to the DC power supply Vdc1 as a load.

Figure 2:
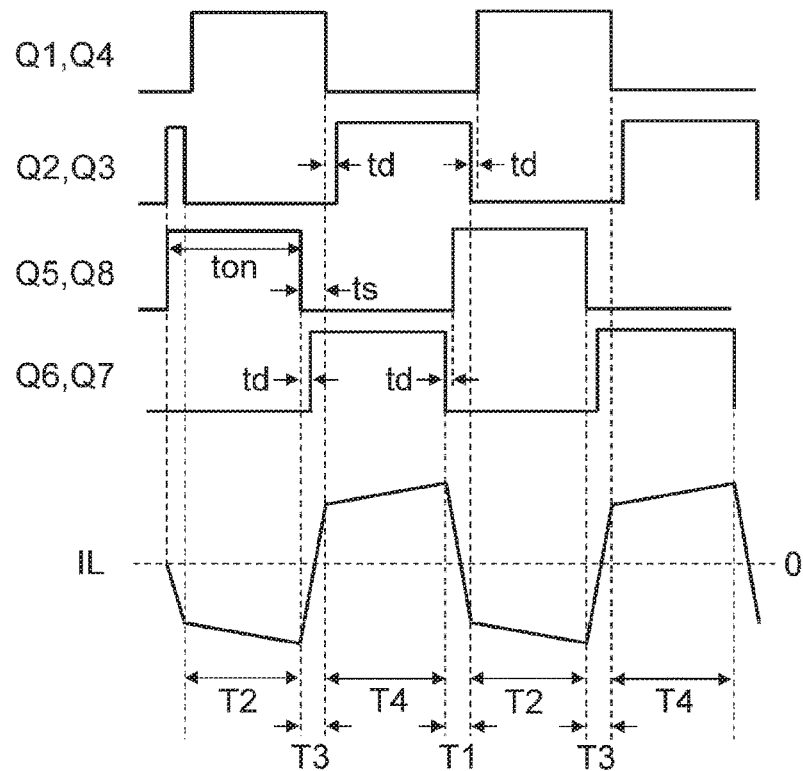
FIG. 2 is a timing chart showing an exemplary operation in the phase difference control mode performed during the step-down mode of the power conversion device of FIG. 1.

FIG. 2 is a timing chart showing an exemplary operation in the phase difference control mode performed during the step-down mode of the power conversion device 10 of FIG. 1. In a period T1, the control circuit 15 generates a drive signal for turning the first switching element Q1 and the fourth switching element Q4 off, turning the second switching element Q2 and the third switching element Q3 on, turning the fifth switching element Q5 and the eighth switching element Q8 off during a dead time td and then turning the elements on, and turning the sixth switching element Q6 and the seventh switching element Q7 off. The control circuit 15 supplies the drive signal to the control terminals (gate terminals) of the first switching element Q1-the eighth switching element Q8. The dead time td is provided between the turn-off of the sixth switching element Q6 and the seventh switching element Q7 and the turn-on of the fifth switching element Q5 and the eighth switching element Q8. The dead time td is inserted to prevent a through current and suppress wasteful power consumption.

In a period T2, the control circuit 15 generates a drive signal for turning the first switching element Q1 and the fourth switching element Q4 off during the dead time td and then turning the elements on, turning the second switching element Q2 and the third switching element Q3 off, turning the fifth switching element Q5 and the eighth switching element Q8 on, and turning the sixth switching element Q6 and the seventh switching element Q7 off. The control circuit 15 supplies the drive signal to the control terminals (gate terminals) of the first switching element Q1-the eighth switching element Q8. The dead time td is provided between the turn-off of the second switching element Q2 and the third switching element Q3 and the turn-on of the first switching element Q1 and the fourth switching element Q4.

In a period T3, the control circuit 15 generates a drive signal for turning the first switching element Q1 and the fourth switching element Q4 on, turning the second switching element Q2 and the third switching element Q3 off, turning the fifth switching element Q5 and the eighth switching element Q8 off, and turning the sixth switching element Q6 and the seventh switching element Q7 off during the dead time td and then turning the elements on. The control circuit 15 supplies the drive signal to the control terminals (gate terminals) of the first switching element Q1-the eighth switching element Q8. The dead time td is provided between the turn-off of the fifth switching element Q5 and the eighth switching element Q8 and the turn-on of the sixth switching element Q6 and the seventh switching element Q7.

In a period T4, the control circuit 15 generates a drive signal for turning the first switching element Q1 and the fourth switching element Q4 off, turning the second switching element Q2 and the third switching element Q3 off during the dead time td and then turning the elements on, turning the fifth switching element Q5 and the eighth switching element Q8 off, and turning the sixth switching element Q6 and the seventh switching element Q7 off. The control circuit 15 supplies the drive signal to the control terminals (gate terminals) of the first switching element Q1-the eighth switching element Q8. The dead time td is provided between the turn-off of the first switching element Q1 and the fourth switching element Q4 and the turn-on of the second switching element Q2 and the third switching element Q3.

The phase difference ts is a period of time between the timing of turn-off of the fifth switching element Q5 and the eighth switching element Q8 and the turn-off of the first switching element Q1 and the fourth switching element Q4. The phase difference ts is equal to the period T1 and the period T3. The current IL flowing in the first leak inductance L1 and the primary winding of the insulated transformer TR1 is controlled in accordance with the phase difference ts. Therefore, the output current Io1 and the output power are also controlled in accordance with the phase difference ts. The control circuit 15 controls the phase difference ts to be smaller to reduce the output current Io1 and the output power and controls the phase difference ts to be larger to increase the output current Io1 and the output power.

When the phase difference ts reaches the predefined lower limit value in the step-down mode for stepping down the input power, i.e., when the output current Io1 is not reduced to the value designated by the current command even if the phase difference ts is reduced to the lower limit value, the control circuit 15 operates in the on-time control mode. For example, the lower limit value is larger than twice the dead time td and is the value derived from adding a margin value to a value twice the dead time td.

Figure 3:
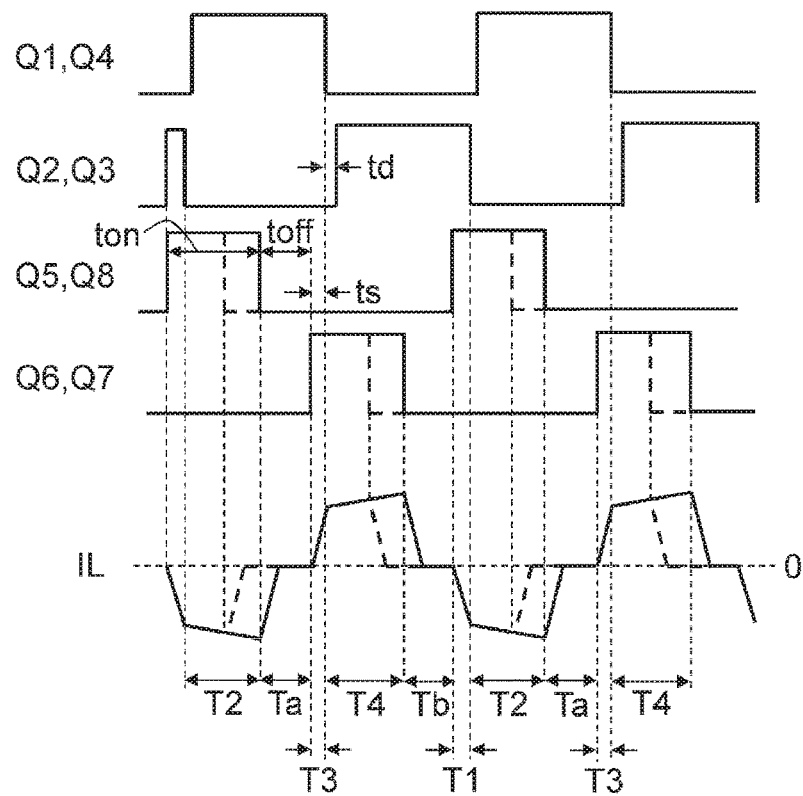
FIG. 3 is a timing chart showing an exemplary operation in the on-time control mode performed during the step-down mode of the power conversion device of FIG. 1.

FIG. 3 is a timing chart showing an exemplary operation in the on-time control mode performed during the step-down mode of the power conversion device 10 of FIG. 1. For power conversion in the direction from the DC power supply Vdc2 to the DC power supply Vdc1, the control circuit 15 in the on-time control mode controls the on-time ton of the fifth switching element Q5-the eighth switching element Q8 of the second bridge circuit 12 on the power transmission side to be shorter, while the phase difference ts is fixed at the lower limit value. More specifically, the control circuit 15 switches from power control based on the phase difference ts to power control based on the on-time ton, when the phase difference ts reaches the lower limit value during the step-down mode. The first switching element Q1-the fourth switching element Q4 are controlled in a manner similar to that of the phase difference control mode.

A period Ta is provided between the period T2 and the period T3. In a period Ta, the control circuit 15 generates a drive signal for turning the first switching element Q1 and the fourth switching element Q4 on, turning the second switching element Q2 and the third switching element Q3 off, and turning the fifth switching element Q5-the eighth switching element Q8 off. The control circuit 15 supplies the drive signal to the control terminals (gate terminals) of the first switching element Q1-the eighth switching element Q8.

A period Tb is provided between the period T4 and the period T1. In a period Tb, the control circuit 15 generates a drive signal for turning the first switching element Q1 and the fourth switching element Q4 off, turning the second switching element Q2 and the third switching element Q3 on, and turning the fifth switching element Q5-the eighth switching element Q8 off. The control circuit 15 supplies the drive signal to the control terminals (gate terminals) of the first switching element Q1-the eighth switching element Q8.

The control circuit 15 controls the amount of power output from the power conversion device 10 by controlling the on-time ton of the fifth switching element Q5-the eighth switching element Q8. When the on-time ton is shortened to change the switching state of the fifth switching element Q5-the eighth switching element Q8 from the solid line to the broken line, the current IL changes from the solid line to the broken line, and the output current Io1 and the output power are decreased. Therefore, the output current Io1 and the output power can be smaller than the minimum value in power control based on the phase difference ts.

Referring to FIG. 3, the off time toff is the time elapsed since the turn-off of the fifth switching element Q5 and the eighth switching element Q8 until the turn-on of the sixth switching element Q6 and the seventh switching element Q7, and the time elapsed since the turn-off of the sixth switching element Q6 and the seventh switching element Q7 until the turn-on of the fifth switching element Q5 and the eighth switching element Q8.

Figure 4:
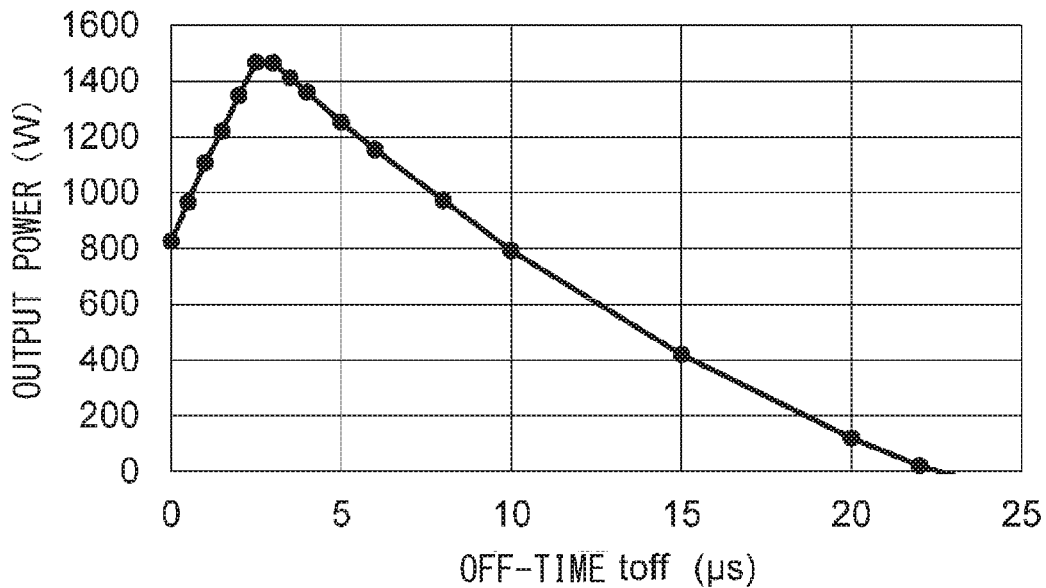
FIG. 4 shows a variation of the output power vs. the off-time in the step-down mode of the power conversion device of FIG. 1.

FIG. 4 shows a variation of the output power vs. the off-time toff in the step-down mode of the power conversion device 10 of FIG. 1. FIG. 4 shows a simulation result produced when the voltage of the DC power supply Vdc1 is 107 V, the voltage of the DC power supply Vdc2 is 300 V, the switching frequency is 20 kHz, and the lower limit value of the phase difference ts is 2.5 μs. As shown in FIG. 4, with an increase in the off-time toff, i.e., with a decrease of the on-time ton from the reference period (about 25 μs), the output power (i.e., the output current Io1) is increased and then decreased. The output power has the maximum value when the off-time toff is about 2.5 μs. The off-time toff where the output power reaches the maximum value varies in accordance with various conditions.

It is considered that the above characteristics result for the following reason. During the periods Ta, Tb in which the fifth switching element Q5-the eighth switching element Q8 of the second bridge circuit 12 are all in an off state, the power conversion device 10 operates in a manner basically identical to the manner of operation in the periods T1, T3 equal to the time difference ts except that the current IL is maintained at zero once it reaches zero. In the example of FIG. 4, in a zone of the off-time toff of 0-about 2.5 μs, the sixth switching element Q6 and the seventh switching element Q7 are turned on after the fifth switching element Q5 and the eighth switching element Q8 are turned off and before the current IL reaches zero. This is equivalent to a sum of the off-time toff and the phase difference ts becoming equal to the phase difference ts. In a zone of the off-time toff of 0-about 2.5 μs, therefore, an increase in the off-time toff is equivalent to an increase in the phase difference ts and results in an increase in the output power.

The characteristics shown in FIG. 4 reveal that, if the on-time ton is decreased from the reference time when the control is switched from the phase difference control mode to the on-time control mode, the output current Io1 is temporarily increased so that power control becomes somewhat unstable. It is therefore preferred to exercise control by additionally taking into consideration the characteristics of FIG. 4. The control circuit 15 controls power based on the on-time ton, starting with the on-time ton that is a predefined proportion or less of the fixed on-time ton (reference value) used during power control based on the phase difference ts. This ensures that power control based on the on-time ton is started in a zone where the output current Io1 is decreased in association with a decrease in the on-tome ton. In comparison with the case where such control is not performed, therefore, the output current Io1 is inhibited from being increased temporarily when the mode is switched to power control based on the on-time ton. Accordingly, power control is stabilized.

The proportion may be determined as appropriate through an experiment or simulation. For example, the proportion may be ⅔. Configuring the proportion to be ⅔ properly ensures that power control based on the on-time ton can start in a zone where the output current Io1 is decreased in association with a decrease in the on-tome ton.

Further, when the on-time reaches the predefined maximum time during power control based on the on-time ton as a result of an increase in the value designated by the current command, i.e., when the output current Io1 is not increased to the value designated by the current command even if the on-time ton is increased to the maximum time, the control circuit 15 returns to power control based on the phase difference ts.

In other words, the control circuit 15 returns to the phase difference control mode when the on-time ton reaches the maximum time and controls the phase difference ts to be larger than the lower limit value so that the output current Io1 approaches the value designated by the current command, while the on-time ton of the fifth switching element Q5-the eighth switching element Q8 of the second bridge circuit 12 on the transmission side is fixed at the reference time. The maximum time may be determined as appropriate through an experiment or simulation. For example, the maximum time may be equal to the reference time or shorter than on-time ton that results in the maximum output power. This can make the output current Io1 larger than the maximum value during power control based on the on-time ton. When the maximum time is shorter than the on-time ton that results in the maximum output power, power control is stabilized.

A description will now be given of the operation performed in the step-down mode of the power conversion device according to a comparative example. The comparative example differs from the power conversion device 10 of FIG. 1 in that the on-time remains constant so that power control based on the on-time is not performed, and the lower limit value of the phase difference ts is not provided.

Figure 5:
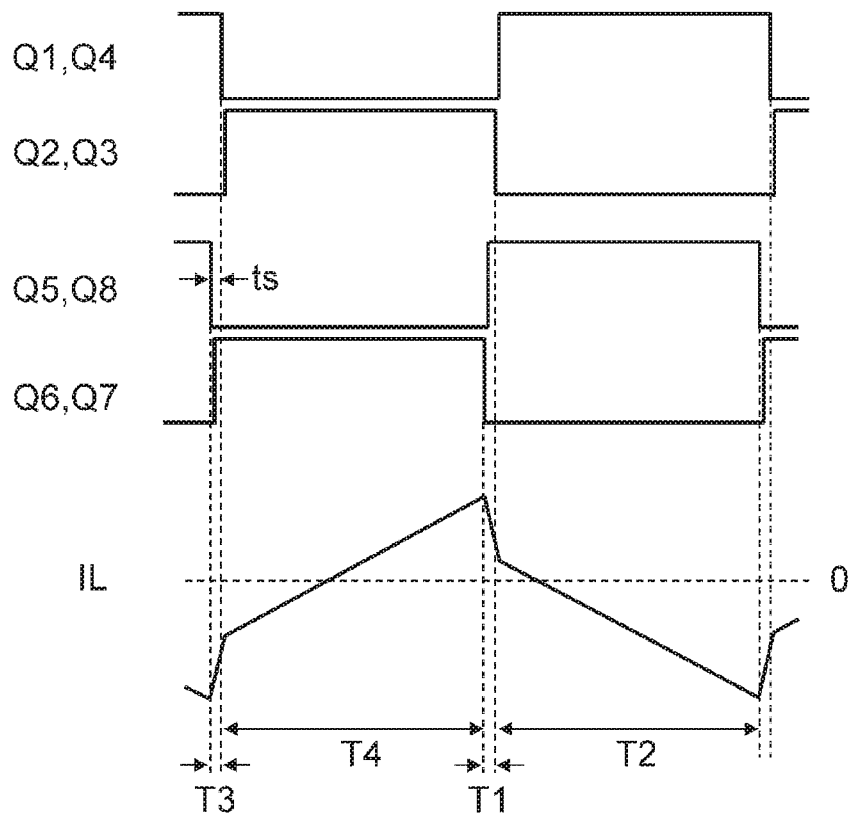
FIG. 5 is a timing chart showing the operation performed during the step-down mode of the power conversion device according to the comparative example.

FIG. 5 is a timing chart showing the operation performed in the step-down mode of the power conversion device according to the comparative example. In the comparative example, the absolute value of the current IL, i.e., the output current Io1, is increased with an elapse of time during the period T2 and the period T4 in which power is being fed from the input side to the output side, even if the phase difference ts is adjusted to be sufficiently small. This is because the output voltage is lower than the input voltage in the step-down mode. It is therefore difficult to adjust the output current Io1 to be sufficiently small in the step-down mode.

It should also be noted that, in the comparative example, the first switching element Q1 and the fourth switching element Q4 are turned on when the period T1 ends, and the second switching element Q2 and the third switching element Q3 are turned on when the period T3 ends, meaning that the elements are turned on in hard switching. This produces a switching loss and makes the power conversion efficiency poorer.

In accordance with the embodiment, on the other hand, the on-time ton of the fifth switching element Q5-the eighth switching element Q8 on the transmission side is controlled to be shorter, with the phase difference ts fixed at the lower limit value, when the phase difference ts reaches the lower limit value in the step-down mode. This blocks the current supplied from the DC power supply Vdc2 to the second bridge circuit 12 while the fifth switching element Q5-the eighth switching element Q8 are in an off state. For this reason, the output current Io1 can be configured to be smaller than the minimum value that occurs during power control based on the phase difference ts. Accordingly, the range of adjustment of the output current Io1 in the step-down mode is improved.

Further, by reducing the on-time ton, the fifth switching element Q5-the eighth switching element Q8 on the transmission side can be turned on while the current IL is substantially zero. Thus, the elements can be turned on in soft switching. Accordingly, the power conversion efficiency is inhibited from becoming poor.

Further, since the lower limit value of the phase difference ts is larger than twice the dead time td, the occurrence of hard switching during power control based on the phase difference ts is inhibited, and the first switching element Q1-the eighth switching element Q8 are turned on in soft switching. Accordingly, the power conversion efficiency is inhibited from becoming poor.

Further, the power conversion device 10 can be realized merely by modifying the control by the control circuit 15 of the comparative example. Therefore, no additional switching elements or additional diodes are necessary, and the cost is inhibited from increasing.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

By reversing the switching control on the first switching element Q1-the fourth switching element Q4 of the first bridge circuit 11 and the switching control on the fifth switching element Q5-the eighth switching element Q8 of the second bridge circuit 12, DC-DC conversion in the reverse direction is possible. For power conversion in the direction from the DC power supply Vdc1 to the DC power supply Vdc2 in the step-down mode, for example, the following control is performed. When the phase difference is reaches the lower limit value in the step-down mode, i.e., when the output current Io2 cannot be reduced to the value designated by the current command even if the phase difference ts is reduced to the lower limit value, the control circuit 15 operates in the on-time control mode. In the on-time control mode, the control circuit 15 controls the on-time ton of the first switching element Q1-the fourth switching element Q4 of the first bridge circuit 11 on the transmission side to be shorter while the phase difference ts is fixed at the lower limit value.

The embodiments may be defined by the following items.

[Item 1]

A power conversion device (10) including: a first bridge circuit (11) that includes a plurality of switching elements (Q1-Q4) and supplies an output power to a load (Vdc1); a second bridge circuit (12) that includes a plurality of switching elements (Q5-Q8) and receives an input power from a DC power supply (Vdc2); an insulated transformer (TR1) connected between the first bridge circuit (11) and the second bridge circuit (12); and a control circuit (15) that controls the plurality of switching elements (Q1-Q4) of the first bridge circuit (11) and the plurality of switching elements (Q5-Q8) of the second bridge circuit (12), wherein the control circuit (15) converts power by controlling a phase difference (ts) between a switching phase of the plurality of switching elements (Q1-Q4) of the first bridge circuit (11) and a switching phase of the plurality of switching elements (Q5-Q8) of the second bridge circuit (12) such that the control circuit controls the phase difference (ts) to be smaller to reduce the output power, and, when the phase difference (ts) reaches a predefined lower limit value in a step-down mode of stepping down the input power, the control circuit controls an on-time (ton) of the plurality of switching elements (Q5-Q8) of the second bridge circuit (12) to be shorter while the phase difference (ts) is fixed at the lower limit value.

[Item 2]

The power conversion device (10) according to item 1, wherein, when the phase difference (ts) reaches the lower limit value in the step-down mode of stepping down the input power, the control circuit (15) switches from power control based on the phase difference (ts) to power control based on the on-time (ton).

[Item 3]

The power conversion device (10) according to item 2, wherein the control circuit (15) controls power based on the on-time (ton), starting with the on-time (ton) that is a predefined proportion or less of a fixed on-time (ton) used during power control based on the phase difference (ts).

[Item 4]

The power conversion device (10) according to item 3, wherein the proportion is ⅔.

[Item 5]

The power conversion device (10) according to any one of items 2 through 4, wherein the control circuit (15) returns to power control based on the phase difference (ts) when the on-time (ton) reaches a predetermined maximum time during power control based on the on-time (ton).

[Item 6]

The power conversion device (10) according to any one of items 1 through 5, wherein the control circuit (15) switches the plurality of switching elements (Q1-Q4) of the first bridge circuit (11) by providing a dead time (td), and the lower limit value is larger than twice the dead time (td).

REFERENCE SIGNS LIST

Vdc1, Vdc2 . . . DC power supply, TR1 . . . insulated transformer, Q1 . . . first switching element, Q2 . . . second switching element, Q3 . . . third switching element, Q4 . . . fourth switching element, Q5 . . . fifth switching element, Q6 . . . sixth switching element, Q7 . . . seventh switching element, Q8 . . . eighth switching element, 10 . . . power conversion device, 11 . . . first bridge circuit, 12 . . . second bridge circuit, 15 . . . control circuit

INDUSTRIAL APPLICABILITY

The present invention relates to power conversion devices that convert a DC power into a desired DC power.

The invention claimed is:

1. A power conversion device comprising:
a first bridge circuit that includes a plurality of switching elements and supplies an output power to a load;
a second bridge circuit that includes a plurality of switching elements and receives an input power from a DC power supply;
an insulated transformer connected between the first bridge circuit and the second bridge circuit; and
a control circuit that controls the plurality of switching elements of the first bridge circuit and the plurality of switching elements of the second bridge circuit, wherein
the control circuit converts power by controlling a phase difference between
a switching phase of the plurality of switching elements of the first bridge circuit and a switching phase of the plurality of switching elements of the second bridge circuit such that the control circuit controls the phase difference to be smaller to reduce the output power, and
when the phase difference reaches a predefined lower limit value in a step-down mode of stepping down the input power, the control circuit controls an on-time of the plurality of switching elements of the second bridge circuit to be shorter while the phase difference is fixed at the predefined lower limit value.

2. The power conversion device according to claim 1, wherein
when the phase difference reaches the predefined lower limit value in the step-down mode of stepping down the input power, the control circuit switches from power control based on the phase difference to power control based on the on-time.

3. The power conversion device according to claim 2, wherein
the control circuit controls power based on the on-time, starting with the on-time that is a predefined proportion or less of a fixed on-time used during power control based on the phase difference.

4. The power conversion device according to claim 3, wherein
the predefined proportion is ⅔.

5. The power conversion device according to claim 2, wherein
the control circuit returns to power control based on the phase difference when the on-time reaches a predetermined maximum time during power control based on the on-time.

6. The power conversion device according to claim 1, wherein
the control circuit switches the plurality of switching elements of the first bridge circuit by providing a dead time,
and the predefined lower limit value is larger than twice the dead time.

* * * * *